United States Patent
Matsui

(10) Patent No.: US 9,779,648 B2
(45) Date of Patent: Oct. 3, 2017

(54) DISPLAY DEVICE FOR CORRECTING WHITE BALANCE BASED ON DEGRADATION AND CHROMATICITY CONTROL METHOD THEREOF

(71) Applicant: NEC Display Solutions, Ltd., Tokyo (JP)

(72) Inventor: Katsuyuki Matsui, Tokyo (JP)

(73) Assignee: NEC Display Solutions, Ltd., Tokyo (JP)

(*) Notice: Subject to any disclaimer, the term of this patent is extended or adjusted under 35 U.S.C. 154(b) by 0 days.

(21) Appl. No.: 14/894,457

(22) PCT Filed: May 31, 2013

(86) PCT No.: PCT/JP2013/065244
§ 371 (c)(1),
(2) Date: Nov. 27, 2015

(87) PCT Pub. No.: WO2014/192148
PCT Pub. Date: Dec. 4, 2014

(65) Prior Publication Data
US 2016/0117970 A1    Apr. 28, 2016

(51) Int. Cl.
*G09G 5/10* (2006.01)
*G09G 3/20* (2006.01)
(Continued)

(52) U.S. Cl.
CPC ......... *G09G 3/2003* (2013.01); *G09G 3/3406* (2013.01); *H04N 9/73* (2013.01);
(Continued)

(58) Field of Classification Search
CPC .................................................... G09G 3/2003
(Continued)

(56) References Cited

U.S. PATENT DOCUMENTS

2008/0151144 A1* 6/2008 Hirose ............. G02F 1/133603
349/69
2010/0026731 A1* 2/2010 Konuma .................. G09G 5/04
345/690
(Continued)

FOREIGN PATENT DOCUMENTS

JP   H 05-127620 A   5/1993
JP   2005-164710 A   6/2005
(Continued)

*Primary Examiner* — Long D Pham
(74) *Attorney, Agent, or Firm* — McGinn IP Law Group, PLLC

(57) ABSTRACT

A display device includes: a generating unit that generates display chromaticity based on a degradation value, a set chromaticity and device chromaticity, the display chromaticity being chromaticity of a white point to be displayed on the display device, the degradation value indicating a degree of degradation of a backlight, the set chromaticity being chromaticity of a white point based on user setting, the device chromaticity being chromaticity of a white point at which brightness becomes highest in the display device. The generating unit makes the display chromaticity approach the device chromaticity from the set chromaticity, as the degree of degradation indicated by the degradation value increases.

9 Claims, 8 Drawing Sheets

(51) Int. Cl.
  *G09G 3/34* (2006.01)
  *H04N 9/77* (2006.01)
  *H04N 9/73* (2006.01)
  *G09G 3/36* (2006.01)

(52) U.S. Cl.
  CPC ............ *H04N 9/77* (2013.01); *G09G 3/3611* (2013.01); *G09G 2320/0233* (2013.01); *G09G 2320/0242* (2013.01); *G09G 2320/048* (2013.01); *G09G 2320/0626* (2013.01); *G09G 2320/0646* (2013.01); *G09G 2320/0666* (2013.01); *G09G 2320/08* (2013.01); *G09G 2360/14* (2013.01); *G09G 2360/145* (2013.01)

(58) Field of Classification Search
  USPC ........................................................ 345/690
  See application file for complete search history.

(56) References Cited

U.S. PATENT DOCUMENTS

2010/0253711 A1* 10/2010 Muroi ............... G02F 1/133603
  345/690
2011/0249116 A1* 10/2011 Yamagishi ............. G01J 3/465
  348/135

FOREIGN PATENT DOCUMENTS

| | | |
|---|---|---|
| JP | 2010-152326 A | 7/2010 |
| JP | 2010-152375 A | 7/2010 |
| JP | 2012-230262 A | 11/2012 |

* cited by examiner

DISPLAY DEVICE FOR CORRECTING WHITE BALANCE BASED ON DEGRADATION AND CHROMATICITY CONTROL METHOD THEREOF

TECHNICAL FIELD

The present invention relates to a display device, a display system, a video output device, and a display device control method.

BACKGROUND ART

A liquid crystal display device is configured by a liquid crystal layer, a backlight device, and the like. The backlight device in such a liquid crystal display device includes a device using white light, and a device that emits white light by mixing three primary colors (for example, red, green, and blue). In the backlight having three-color light sources, adjustment of white balance (chromaticity of a white point) is performed by changing the balance of brightness of the three colors (for example, refer to Patent Document 1).

In a display device that displays a graphic image for medical use or the like, it is desired to maintain a certain brightness desired by a user for a long time. In a display device in which a backlight used for such an application has a light source configured by three-color cold-cathode tubes, a gain with respect to a video signal to be input so that the white balance becomes a desired balance has been set at the time of shipment, and device chromaticity has been adjusted by the set gain. The device chromaticity is the chromaticity of a white point, at which the brightness becomes highest in an own display device, and is the chromaticity of the white point obtained at the time of providing maximum power to the backlight and maximum tone to the video signal. The white point is also referred to as a "Native white point" in manufactured products. In a display device that maintains a constant brightness, if the device chromaticity is degraded with time and a difference in chromaticity in a color space between the device chromaticity and the set chromaticity increases, degradation of brightness is likely to occur. The set chromaticity is the chromaticity of the white point based on user setting.

Therefore, in the display device that maintains a constant brightness, even if the display device changes over time, correction is performed by using a correction value with respect to the white balance at the time of shipment, to keep the difference in chromaticity between the device chromaticity and the set chromaticity constant, thereby reducing a decrease in brightness.

PRIOR ART DOCUMENT

Patent Document

[Patent Document 1] Japanese Unexamined Patent Application, First Publication No. H5-127620

SUMMARY OF THE INVENTION

Problem to be Solved by the Invention

However, recently, an LED (light emitting diode) has been used as a light source of the backlight, and the way of degradation with time is different from the case of the cold-cathode tube. Therefore, in a backlight using an LED, even if correction of the initially set white balance as in the backlight using the cold-cathode tube, is used continuously even after change over time, a long time for maintaining a constant brightness cannot be ensured.

The present invention has been achieved in view of the above problem, with an exemplary object of providing a display device, a video output device, and a display device control method that can improve the time for maintaining the brightness selected by the user.

Means for Solving the Problem

In order to achieve the above object, the display device according to the present invention includes: a generating unit that generates display chromaticity based on a degradation value, a set chromaticity and device chromaticity, the display chromaticity being chromaticity of a white point to be displayed on the own display device, the degradation value indicating a degree of degradation of a backlight, the set chromaticity being chromaticity of a white point based on user setting, the device chromaticity being chromaticity of a white point at which brightness becomes highest in the own display device, and the display chromaticity approaches the device chromaticity from the set chromaticity, as the degree of degradation indicated by the degradation value increases.

In order to achieve the above object, a display system according to the present invention includes a display device and a video output device, the display device includes: a backlight that includes a light source; and a drive unit that drives the backlight, the video output device includes: a generating unit that generates display chromaticity based on a degradation value, a set chromaticity and device chromaticity, the display chromaticity being chromaticity of a white point to be displayed on the display device, the degradation value indicating a degree of degradation of the backlight, the set chromaticity being chromaticity of a white point based on user setting, the device chromaticity being chromaticity of a white point at which brightness becomes highest in the display device; and a video signal adjusting unit that adjusts a gain of a video signal or a drive value for driving the backlight, based on the display chromaticity generated by the generating unit, and the display chromaticity approaches the device chromaticity from the set chromaticity, as the degree of degradation indicated by the degradation value increases.

In order to achieve the above object, a video output device according to the present invention includes: a generating unit that generates display chromaticity based on a degradation value, a set chromaticity and device chromaticity, the display chromaticity being chromaticity of a white point to be displayed on a display device, the degradation value indicating a degree of degradation of a backlight, the set chromaticity being chromaticity of a white point based on user setting, the device chromaticity being chromaticity of a white point at which brightness becomes highest in the display device; a video signal adjusting unit that adjusts a gain of a video signal or a drive value for driving the backlight based on the display chromaticity generated by the generating unit; and an output unit that outputs the video signal or the drive value that has been adjusted by the video signal adjusting unit, to the display device including the backlight, and the display chromaticity approaches the device chromaticity from the set chromaticity, as the degree of degradation indicated by the degradation value increases.

In order to achieve the above object, a display device control method according to the present invention includes: the generating step of generating display chromaticity based on a degradation value, a set chromaticity and device chromaticity, the display chromaticity being chromaticity of a white point to be displayed on an own display device, the degradation value indicating a degree of degradation of a backlight, the set chromaticity being chromaticity of a white point based on user setting, the device chromaticity being chromaticity of a white point at which brightness becomes highest in the own display device; and the step of adjusting a gain of a video signal or a drive value for driving the backlight based on the display chromaticity generated by the generating step, and the display chromaticity approaches the device chromaticity from the set chromaticity, as the degree of degradation indicated by the degradation value increases.

Effect of the Invention

The display device of the present invention can improve the time for maintaining the brightness selected by the user.

EMBODIMENTS FOR CARRYING OUT THE INVENTION

First Exemplary Embodiment

Hereunder, exemplary embodiments of the present invention will be described in detail with reference to the drawings.

Figure 1:
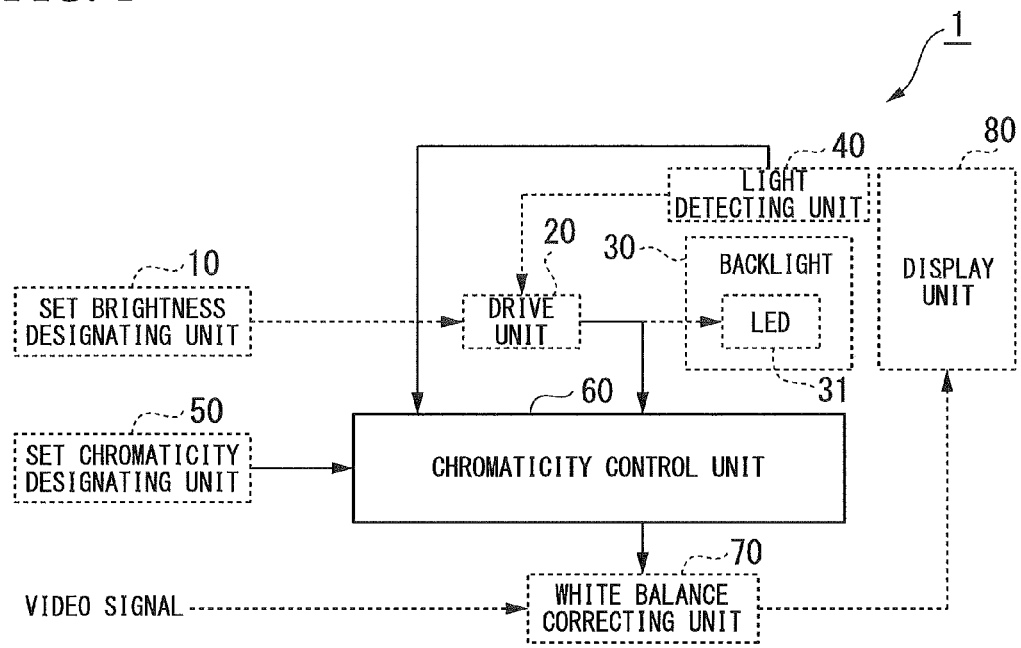
FIG. 1 is a block diagram of a schematic configuration of a display device according to a first exemplary embodiment.

FIG. 1 is a block diagram of a schematic configuration of a display device 1 according to the present exemplary embodiment. As shown in FIG. 1, the display device 1 includes a set brightness designating unit 10, a drive unit 20, a backlight 30, a light detecting unit 40, a set chromaticity designating unit 50, a chromaticity control unit 60, a white balance correcting unit 70, and a display unit 80.

The set brightness designating unit 10 receives set brightness set by an operation of a user, and outputs the received set brightness to the drive unit 20. The set brightness designating unit 10 includes, for example, a switch and a remote-control light receiving unit provided in a body. Here, the set brightness is, for example, a value of K (kelvin), or a value of Y in a (Commission Internationale de l'Eclairage; International Commission on Illumination)—Yxy display system.

The drive unit 20 generates a drive value of the backlight 30 based on the set brightness output by the set brightness designating unit 10 and a detection value output by the light detecting unit 40, and outputs the generated drive value to the backlight 30 and the chromaticity control unit 60. When the drive unit 20 performs drive by, for example, PWM (Pulse Width Modulation), the drive value to be generated is a pulse signal.

The backlight 30 is configured to include an LED (light-emitting diode) 31 being a light source. The LED 31 is, for example, a white LED. The backlight 30 emits light according to the drive value output by the drive unit 20. The backlight 30 is attached, for example, to a back surface of the display unit 80. Alternatively, the backlight 30 is attached to a lower part of the display unit 80, and emitted light is diffused by a light guide plate, a light diffusion film, or the like in the display unit 80.

The light detecting unit 40 detects brightness and chromaticity of a predetermined image to be displayed on a display equipped with the backlight 30 or the display unit 80, and outputs the detected detection brightness to the drive unit 20, and outputs the detected detection chromaticity to the chromaticity control unit 60. The light detecting unit 40 may include a color sensor corresponding to wavelengths of blue, green, and red to detect brightness and chromaticity of each color, and may output detected detection brightness of each color to the drive unit 20, and output detected detection chromaticity of each color to the chromaticity control unit 60. The light detecting unit 40 may detect brightness and chromaticity at all times, or may regularly detect brightness and chromaticity with a predetermined cycle, or may detect brightness and chromaticity, upon reception of a request to detect brightness and chromaticity from the user. Moreover, the light detecting unit 40 may be attached to the display unit 80 only when brightness measurement is performed.

The timing for detecting brightness and chromaticity by the light detecting unit 40 may be a predetermined cycle, a predetermined date and time, at random, at a time designated by the user, or the like.

The set chromaticity designating unit 50 receives set chromaticity set by an operation of the user, and outputs the received set chromaticity to the chromaticity control unit 60. The set chromaticity designating unit 50 includes, for example, a switch and a remote-control light receiving unit provided in the body. Here, the set chromaticity is, for example, (x, y) value in the CIE-Yxy display system, values of u* and v* in an L*u*v* display system, or a ratio with respect to respective colors of RGB. Moreover, the set chromaticity is chromaticity of a white point based on a user setting set by the user.

The chromaticity control unit 60 calculates display chromaticity based on the set chromaticity output by the set chromaticity designating unit 50, the drive value output by the drive unit 20, and the detected chromaticity output by the light detecting unit 40, and outputs the calculated display chromaticity to the white balance correcting unit 70. The display chromaticity is the chromaticity of the white point to be displayed on the display device 1.

The white balance correcting unit 70 controls a gain of a video signal input from outside (hereinafter, referred to as "video gain") corresponding to the display chromaticity output by the chromaticity control unit 60, and displays the controlled video signal on the display unit 80. In other words, the white balance correcting unit 70 is a video signal adjusting unit that adjusts the gain of the video signal based on the display chromaticity, being a correction value generated by the chromaticity control unit 60 serving as a generating unit.

The display unit 80 displays a video image according to control by the white balance correcting unit 70. The display unit 80 is, for example, a liquid crystal panel of a TFT (Thin Film Transistor) system. A display element to be mounted on the display unit 80 may be a display element other than the liquid crystal system, for example, an organic electroluminescence display element, an inorganic electroluminescence display element, or a PALC (Plasma Address Liquid Crystal), a PDP (Plasma Display Panel), an FED (Field Emission Display), or a projector of a DMD (digital micromirror device) system.

Figure 2:
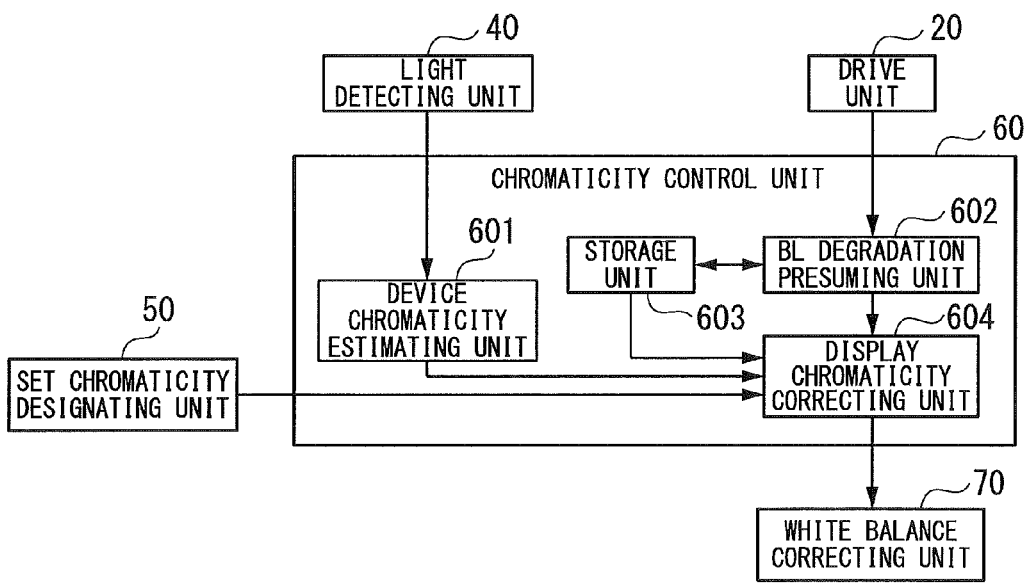
FIG. 2 is a diagram for explaining an example of a configuration of a chromaticity control unit according to the first exemplary embodiment.

FIG. 2 is a diagram for explaining an example of a configuration of the chromaticity control unit 60 according to the present exemplary embodiment. As shown in FIG. 2, the chromaticity control unit 60 includes a device chromaticity estimating unit 601, a BL (backlight) degradation presuming unit 602, a storage unit 603, and a display chromaticity correcting unit 604.

The device chromaticity estimating unit 601 estimates device chromaticity based on the detected chromaticity output by the light detecting unit 40 according to a well-known method, and outputs the estimated device chromaticity to the display chromaticity correcting unit 604. Here, the device chromaticity is the chromaticity of a white point at which the brightness becomes highest, and is the chromaticity of the white point obtained at the time of providing maximum power to the backlight and maximum tone to the video signal. The white point is generally referred to as a Native white point. The device chromaticity estimating unit 601 estimates chromaticity having maximum brightness as the device chromaticity, according to a well-known method based on, for example, initial characteristics of the backlight 30 or the display unit 80, and light transmission characteristics of a liquid crystal panel when the display unit 80 includes a liquid crystal panel. The maximum brightness is decided by a relation between, for example, an amount of luminescence of the backlight 30 and transmittance of the liquid crystal panel.

The device chromaticity estimating unit 601 may output the detected chromaticity output by the light detecting unit 40 to the BL degradation presuming unit 602 as the set chromaticity.

The BL degradation presuming unit 602 obtains the drive value output by the drive unit 20. The BL degradation presuming unit 602 stores the drive value in an initial state of the backlight 30 (hereinafter, referred to as "reference drive value") in the storage unit 603. The BL degradation presuming unit 602 presumes a BL degradation value, being a degree of degradation of the backlight 30, based on the reference drive value stored in the storage unit 603 and the current drive value (hereinafter, referred to as "current drive value") output by the drive unit 20. The BL degradation presuming unit 602 outputs the presumed BL degradation value to the display chromaticity correcting unit 604. For example, the BL degradation presuming unit 602 calculates the BL degradation value by using the following equation (1).

$$\text{BL degradation [\%]} = (\text{reference drive value/current drive value}) \times 100 \quad (1)$$

When drive is performed by PWM, the drive value may be a duty of an on time, a mean value of drive current, a mean value of a drive voltage, or the like.

The reference drive value and operation characteristics of target chromaticity correction are stored in the storage unit 603. The Operation characteristics of the target chromaticity correction will be described later.

The display chromaticity correcting unit 604 mixes the set chromaticity and the device chromaticity to calculate the display chromaticity, based on the set chromaticity output by the set chromaticity designating unit 50, the device chromaticity output by the device chromaticity estimating unit 601, and the BL degradation value output by the BL degradation presuming unit 602. The display chromaticity correcting unit 604 outputs the calculated display chromaticity, to the white balance correcting unit 70. For example, the display chromaticity correcting unit 604 calculates the display chromaticity by using the following equation (2).

$$\text{Display chromaticity} = k \times \text{set chromaticity} + (1-k) \times \text{device chromaticity} \quad (2)$$

In the equation (2), reference symbol k denotes the BL degradation value. Moreover, reference symbol k is a value between 0 and 1, and indicates an initial state when the reference symbol k is 1, and indicates that the backlight is degraded as the reference symbol k approaches 0. In other words, as shown by the equation (2), the display chromaticity is a value obtained by adding, a value obtained by multiplying the set chromaticity by the BL degradation value, and a value obtained by multiplying a value obtained by subtracting the BL degradation value from 1 by the device chromaticity.

Figure 3:
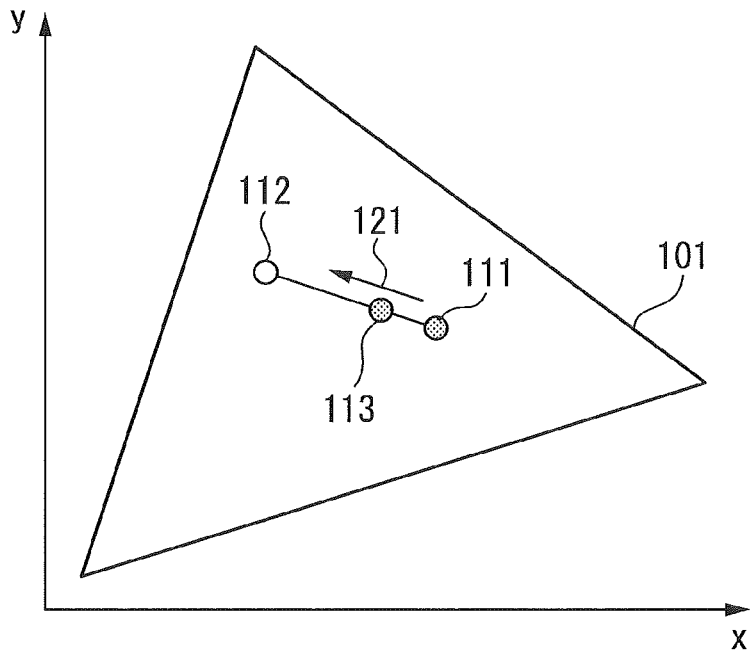
FIG. 3 is a diagram for explaining set brightness, set chromaticity, and display chromaticity according to the first exemplary embodiment.

FIG. 3 is a diagram for explaining the set brightness, the set chromaticity, and the display chromaticity according to the present exemplary embodiment. FIG. 3 is an XY chromaticity diagram in a CIE1931 (XYZ) color system, where x denotes the horizontal axis, and y denotes the vertical axis. As shown in FIG. 3, in the chromaticity diagram in the CIE1931 color system, respective apexes surrounded by an almost triangle 101 respectively correspond to G (green), B (blue), and R (red). Moreover, an area surrounded by the almost triangle 101 represents a color space displayable by the display unit 80.

Point 111 denotes the set chromaticity, and point 112 denotes the device chromaticity. Moreover, point 113 denotes the chromaticity after correction.

In the initial state, because degradation of the backlight 30 has not occurred, k is 1. At this time, the chromaticity after correction is equal to the set chromaticity. That is to say, in the initial state, the chromaticity control unit 60 does not perform correction with respect to the set chromaticity. As a result, the position of point 113 is equal to the position of point 111.

When degradation of the backlight 30 has occurred, and k is 0.5, the display chromaticity is 0.5×set chromaticity+ 0.5×device chromaticity. That is to say, the set chromaticity and the device chromaticity are mixed at the same ratio, and the position of point 113 is the middle of a straight line connecting points 111 and 112. In other words, the display chromaticity correcting unit 604 generates the display chromaticity, being a correction value, so as to be on a line segment connecting target chromaticity and uncorrected chromaticity, in a predetermined color space. Here, being on the line segment connecting the target chromaticity and the uncorrected chromaticity includes, as shown in FIG. 3, a line segment connecting points 111 and 112, and the vicinity of the line segment. Moreover, in FIG. 3, a straight line is shown as an example of the line segment connecting points 111 and 112. However, the line segment is not limited to the straight line, and may be a curved line.

Furthermore when an operating time is prolonged and degradation of the backlight 30 proceeds and k becomes 0, the display chromaticity becomes equal to the device chromaticity. That is to say, in a state with the backlight 30 degrading, the position of point 113 becomes equal to the position of point 112.

As shown by the arrow 121 in FIG. 3, the chromaticity control unit 60 according to the present exemplary embodiment performs correction so that the set chromaticity is approximated to the device chromaticity according to the degree of degradation.

Figure 4:
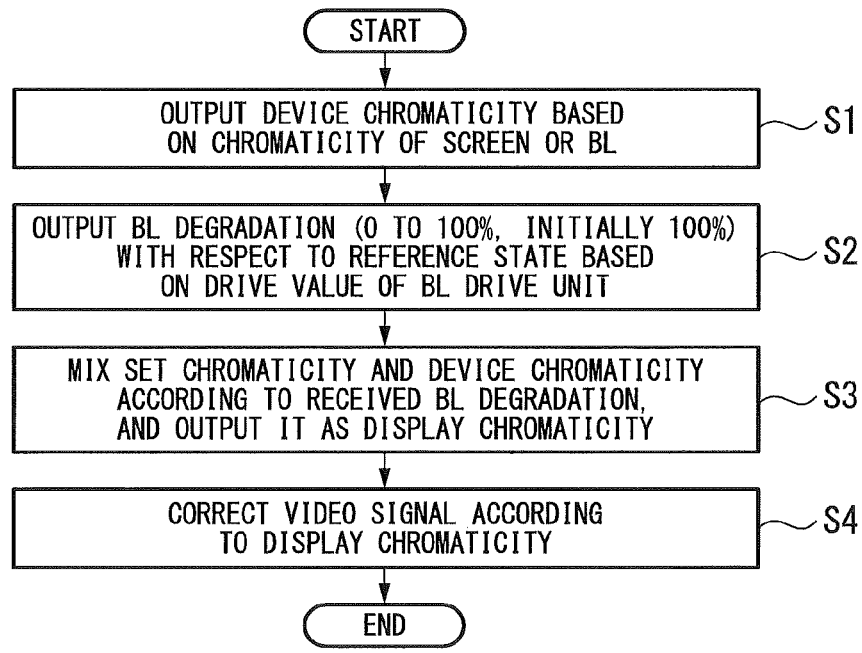
FIG. 4 is a flowchart showing a process procedure of the chromaticity control unit according to the first exemplary embodiment.

Next, FIG. 4 which explains a process procedure of the chromaticity control unit 60, is a flowchart of the process procedure of the chromaticity control unit 60 according to the present exemplary embodiment.

(Step S1) The device chromaticity estimating unit 601 estimates the device chromaticity according to a well-known method, based on the detection chromaticity output by the light detecting unit 40, and the set chromaticity output by the set chromaticity designating unit 50, and outputs the estimated device chromaticity to the BL degradation presuming unit 602.

(Step S2) The BL degradation presuming unit 602 presumes the BL degradation value, for example, according to the equation (1), based on the reference drive value stored in the storage unit 603 and the current drive value output by the drive unit 20. The BL degradation presuming unit 602 outputs the presumed BL degradation value to the display chromaticity correcting unit 604.

(Step S3) The display chromaticity correcting unit 604 calculates the display chromaticity, for example, according to the equation (2), based on the set chromaticity output by the set chromaticity designating unit 50, the device chromaticity output by the device chromaticity estimating unit 601, and the BL degradation value output by the BL degradation presuming unit 602. The display chromaticity correcting unit 604 outputs the calculated display chromaticity to the white balance correcting unit 70.

(Step S4) The white balance correcting unit 70 controls a video gain with respect to the video signal corresponding to the display chromaticity output by the chromaticity control unit 60, and displays the controlled video signal on the display unit 80.

Figure 5:
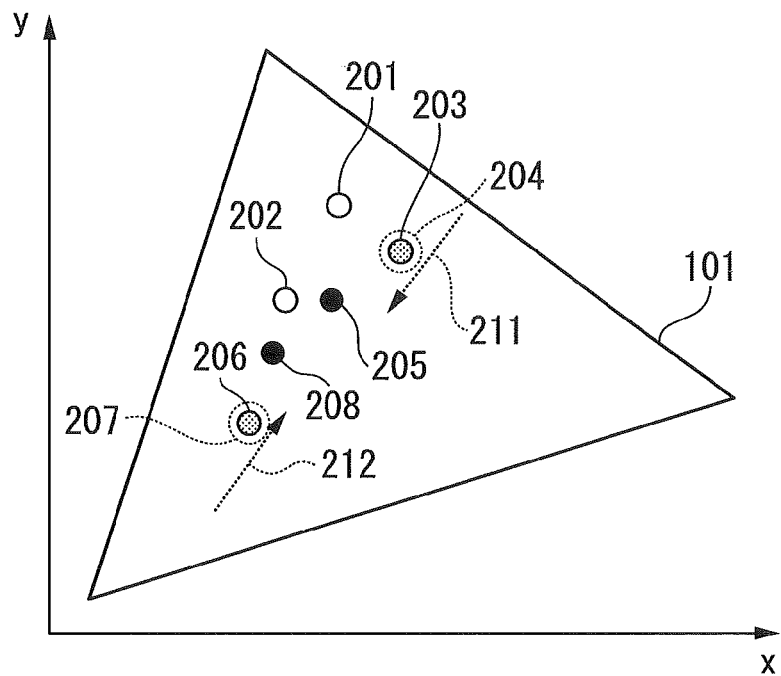
FIG. 5 is a diagram for explaining a correction example of chromaticity according to the first exemplary embodiment.

FIG. 5 is a diagram for explaining a correction example of chromaticity according to the present exemplary embodiment. FIG. 5 is an XY chromaticity diagram in the CIE1931 (XYZ) color system as in FIG. 3, and x denotes the horizontal axis, and y denotes the vertical axis. The area surrounded by the almost triangle 101 represents the color space displayable by the display unit 80. Point 201 denotes the device chromaticity in the initial state, and point 202 denotes the device chromaticity after the backlight has been used for a long time. Here, a long time means, for example, several thousand hours. Point 204 denotes the set chromaticity set by a first user. Points 203 and 205 denote display chromaticity corresponding to the point 204. The point 203 denotes the display chromaticity in the initial state, and the point 205 denotes the display chromaticity after long time use. Moreover, point 207 denotes the set chromaticity set by a second user. Points 206 and 208 denote the display chromaticity corresponding to the point 207. The point 206 denotes the display chromaticity in the initial state, and the point 208 denotes the display chromaticity after long time use. Thus, the display chromaticity moves with degradation of the backlight 30.

As shown by the arrow 211, the chromaticity control unit 60 shifts the point 203 indicating the display chromaticity in the initial state to the point 205 indicating the display chromaticity after long time use, corresponding to degradation of the backlight 30, and calculates the display chromaticity for correcting the chromaticity so as to be approximated to the point 202 indicating the device chromaticity after long time use. Moreover, as shown by the arrow 212, the chromaticity control unit 60 shifts the point 206 indicating the display chromaticity in the initial state to the point 208 indicating the display chromaticity after long time use, corresponding to degradation of the backlight 30, and calculates the display chromaticity for correcting the chromaticity so as to be approximated to the point 202 indicating the device chromaticity after long time use.

Accordingly, the chromaticity control unit 60 calculates the display chromaticity for correcting the chromaticity so that the display chromaticity after long time use, which is different from each other as shown in FIG. 5 (points 205 and 208), is approximated to the display chromaticity after long time use (point 202). As a result, even if a plurality of users sets set chromaticity respectively, the white balance correcting unit 70 corrects the video gain with respect to the video signal corresponding to the calculated display chromaticity, thereby enabling to prolong the time during which the rightness can be maintained constant, as compared with a conventional case where the brightness is maintained with the video gain being in the initial value.

Figure 6:
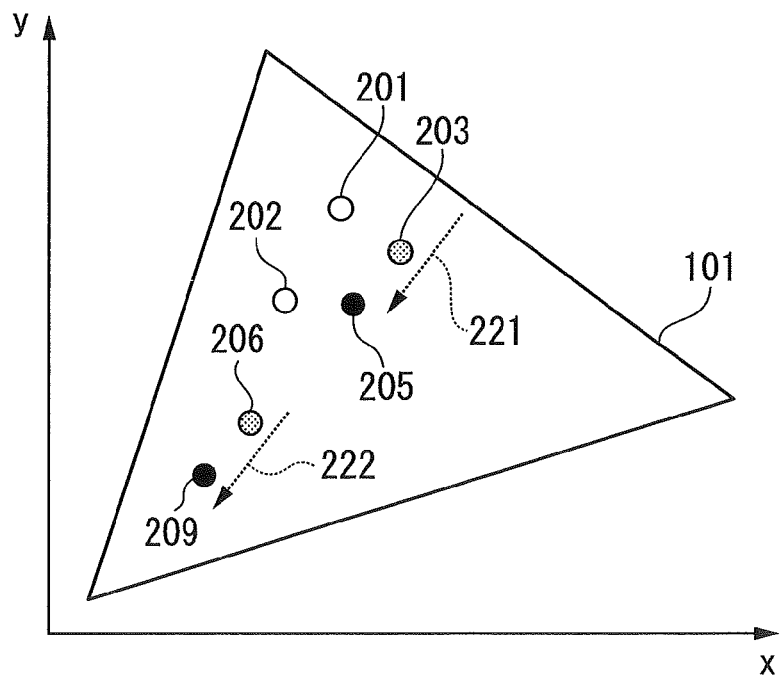
FIG. 6 is a diagram for explaining an example of a general chromaticity correction method in the display device.

FIG. 6 is a diagram for explaining an example of a general chromaticity correction method in the display device. FIG. 6 is an XY chromaticity diagram in the CIE1931 (XYZ) color system as in FIG. 5. Points 201, 202, 203, and 206 are the same as those in FIG. 5. The example shown in FIG. 6 is an example in which the correction value with respect to the initial chromaticity is maintained without a change.

Corresponding to degradation of the backlight 30, the point 201 indicating the initial device chromaticity moves to the point 202, and accompanying this, the points 203 and 206 indicating the display chromaticity in the initial state move to points 205 and 209, respectively.

That is to say, in the general display device, a color difference between the point 201 indicating the initial device chromaticity and the point 203, and the color difference between the point 202 indicating the device chromaticity after long time use and the point 205 are substantially the same. Similarly, the color difference between the point 201 and the point 206 and the color difference between the point 202 and the point 209 are substantially the same.

Figure 7:
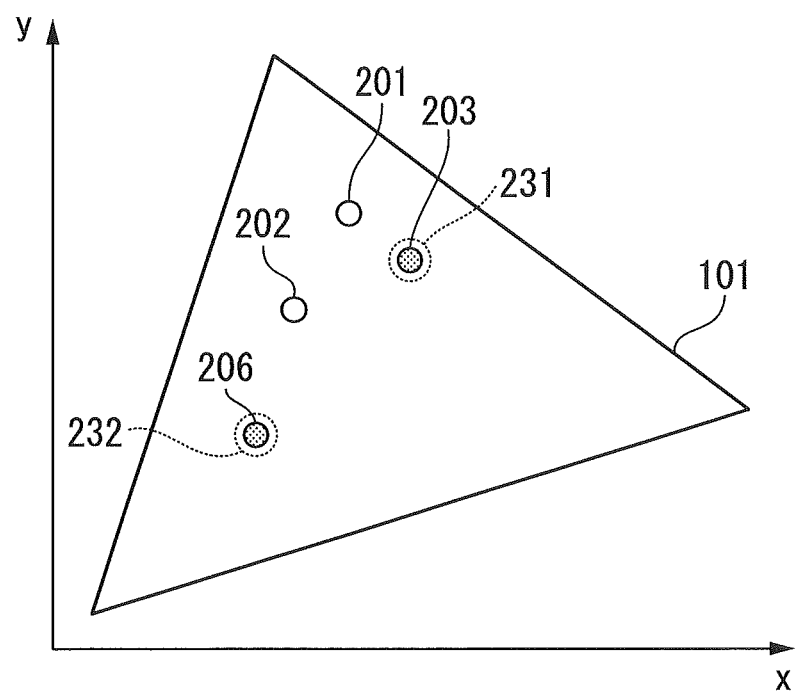
FIG. 7 is a diagram for explaining another example of the general chromaticity correction method in the display device.

A different example is described next as a general chromaticity correction method in the display device. FIG. 7 is a diagram for explaining another example of the general chromaticity correction method in the display device. FIG. 7 is an XY chromaticity diagram in the CIE1931 (XYZ) color system as in FIG. 5. Points 201, 202, 203, and 206 are the same as those in FIG. 5. The example shown in FIG. 7 is an example in which the correction value is corrected as needed, so that the display chromaticity and the set chromaticity match with each other.

In this method, the display chromaticity and the set chromaticity are matched with each other, regardless of the degradation of the backlight 30. That is to say, as shown in FIG. 7, the point 203 indicating the display chromaticity in the initial state and the point 231 indicating the display chromaticity after long time use are matched with each other. Similarly, the point 206 indicating the display chromaticity in the initial state and the point 232 indicating the display chromaticity after long time use are matched with each other. Also in this case, as in FIG. 6, the point 201 indicating the initial device chromaticity moves to the point 202, with degradation of the backlight 30.

Therefore, the color difference between the device chromaticity and the display chromaticity changes depending on the degradation of the backlight 30. That is to say, the color difference between the device chromaticity and the display chromaticity increases with the long time use, depending on the set chromaticity. In this case, brightness loss due to chromaticity correction increases. Because an output of the backlight 30 is increased so as to compensate the brightness loss and maintain the brightness of the white point to be displayed on the display device, the output of the backlight 30 reaches an upper limit in a short time. As a result, the time during which the predetermined brightness can be maintained (the time until reaching an upper limit of the output of the backlight 30) decreases.

Figure 8:
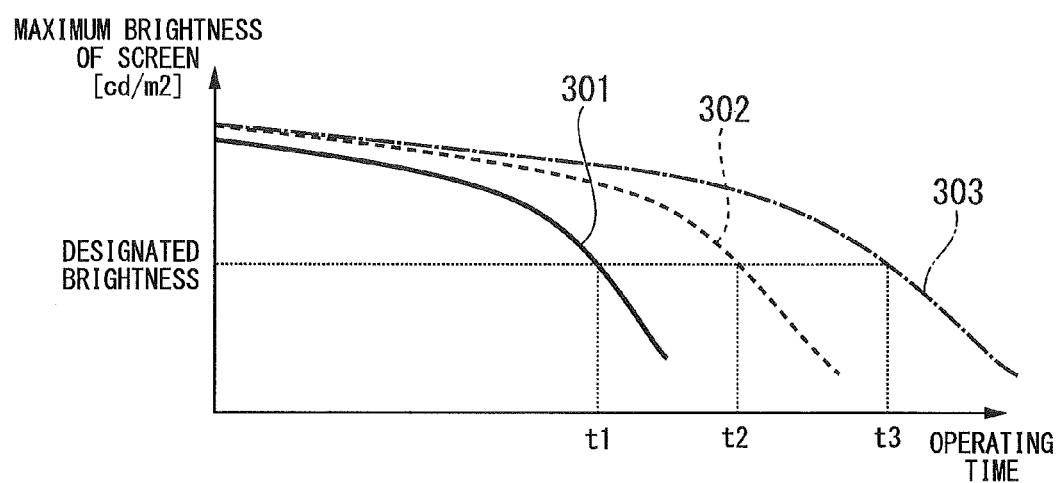
FIG. 8 is a diagram for explaining an example of brightness life of respective light sources of three primary colors of red, green, and blue.

However, in the general display device, the degree of degradation is different for each light source as shown in FIG. 8. FIG. 8 is a diagram for explaining an example of the brightness life of respective light sources of three primary colors of red, green, and blue. In FIG. 8, the operating time is plotted on the horizontal axis, and maximum brightness of a screen is plotted on the vertical axis. Curved line 301 denotes a change of the maximum brightness of the screen with respect to the operating time of the red light source. Curved line 302 denotes a change of the maximum brightness of the screen with respect to the operating time of the green light source. Curved line 303 denotes a change of the maximum brightness of the screen with respect to the operating time of the blue light source.

For example, when the backlight is a three colored LED (light-emitting diode) of red, green, and blue, as shown in FIG. 8, brightness of the red LED first starts to decrease. Then at an operating time t1, the maximum brightness reaches designated brightness. Next, brightness of the green LED starts to decrease, and the maximum brightness reaches designated brightness at an operating time t2. Lastly, brightness of the blue LED starts to decrease, and the maximum brightness reaches designated brightness at an operating time t3. Thus, when the brightness of one light source starts to decrease, the brightness of the remaining light sources needs to be decreased, matched with the brightness of the light source, whose brightness starts to decrease. Even if the backlight includes the light source of a white LED, similarly the brightness of the red component starts to decrease first. Therefore, in the conventional display device with an application of maintaining the chromaticity constant, there is a problem in that the time capable of maintaining the brightness (hereinafter, referred to as "brightness life") is extremely short. For example, in the conventional display device that maintains chromaticity (due to a difference in the control characteristics even if the same display device), for example, the brightness life has been 8000 hours.

On the other hand, the display device 1 in the present exemplary embodiment uses the value of presumed BL degradation indicating degradation of the LED 31 of the backlight 30, to correct so that the corrected chromaticity gradually approximates to the device chromaticity after long time use. As a result, as described above, the display device 1 according to the present exemplary embodiment can gradually decrease the difference between the corrected chromaticity and the device chromaticity after long time use, regardless of the set chromaticity. As a result, the display device 1 according to the present exemplary embodiment decreases the difference between the corrected chromaticity and the device chromaticity after long time use, thereby enabling to extend the brightness life as compared with the conventional display device. For example, in the display device 1 according to the present exemplary embodiment, the brightness life is 30000 hours.

Figure 9:
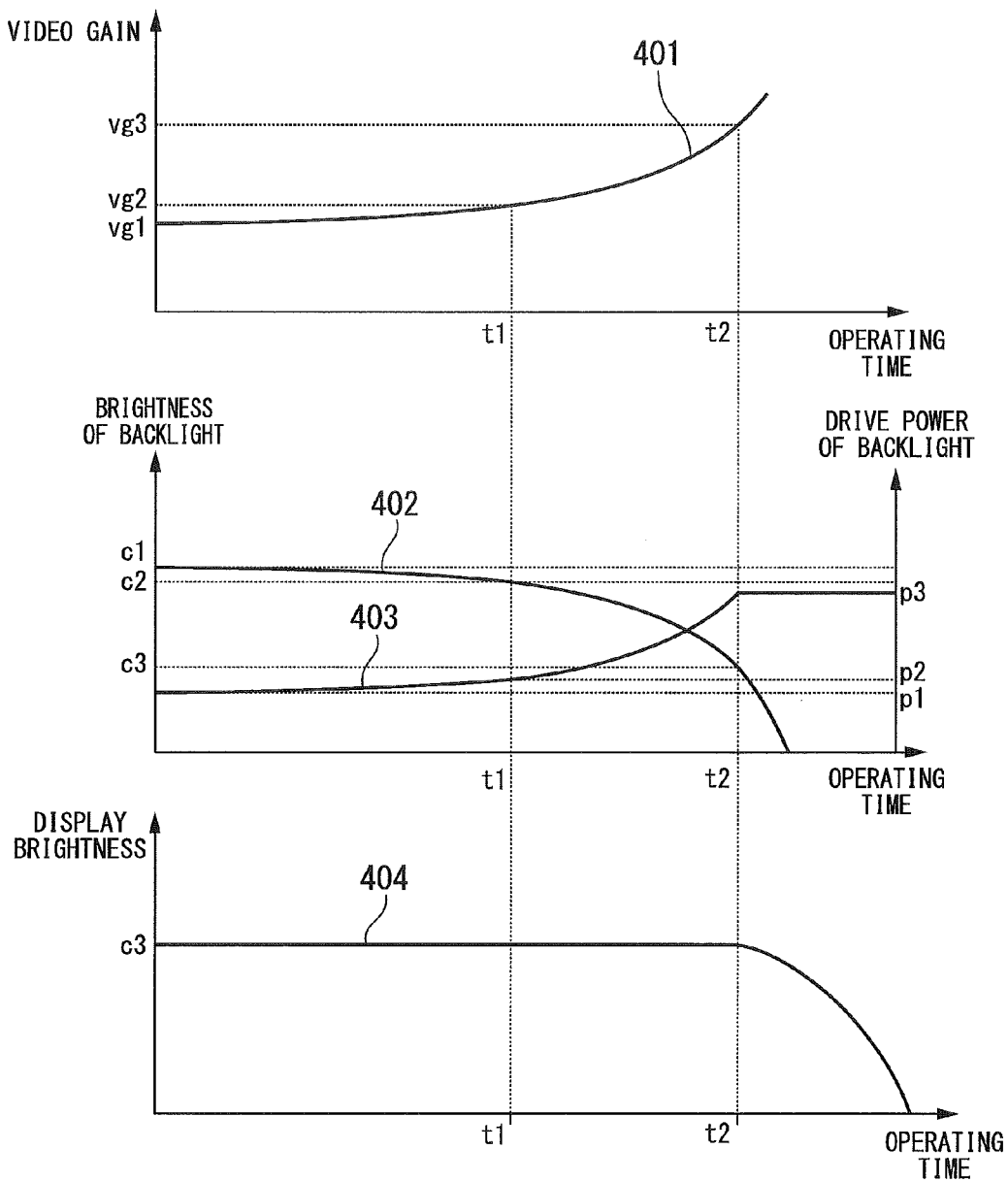
FIG. 9 is a diagram for explaining an example of an operation of constituent elements of the display device with respect to an operating time according to the first exemplary embodiment.

Next is a description of the video gain with respect to the video signal, the drive power of the backlight 30, the brightness of the backlight 30, and the brightness to be displayed on the display unit 80 (hereinafter, referred to as "display brightness") in the present exemplary embodiment. FIG. 9 is a diagram for explaining an example of an operation of the constituent elements of the display device 1 with respect to the operating time according to the present exemplary embodiment.

In FIG. 9, the operating time is plotted on the horizontal axis and the video gain is plotted on the vertical axis of a curved line 401, the brightness of the backlight is plotted on the vertical axis of a curved line 402, the drive power of the backlight is plotted on the vertical axis of a curved line 403, and the display brightness is plotted on the vertical axis of a curved line 404.

The curved line 401 in FIG. 9 represents a change of the video gain with a decrease of a value of k from 1 to a value close to 0, according to the operating time. Moreover, as indicated by the curved line 401, the initial video gain is vg1. The video gain vg1 is larger than 0 and equal to or less than 1, and is for example, 0.7. Furthermore, video gains vg2 and vg3 are also equal to or less than 1.

Moreover, the curved line 402 represents a change of the brightness of the backlight 30 required for obtaining the designated brightness with the passage of the operating time. Furthermore, as indicated by the curved line 402, the initial brightness of the backlight 30 is c1.

Moreover, the curved line 403 represents a change of the drive power of the backlight 30 with degradation of the backlight 30. Furthermore, as indicated by the curved line 403, the initial drive power of the backlight 30 is p1.

Moreover, as indicated by the curved line 404, the initial display brightness is c3. The initial display brightness c3 is designated brightness designated by the user beforehand, or designated brightness preset to the display device 1.

At the operating time t1, the value of k decreases to a value between 1 to 0. Consequently, as indicated by the curved line 401, the video gain increases from vg1 to vg2 by the operation of the white balance correcting unit 70. Accordingly, as indicated by the curved line 402, the brightness of the backlight 30 decreases from c1 to c2. Because the detection brightness output by the light detecting unit 40 has decreased from c1 to c2, the drive unit 20 increases the drive value to be output to the backlight 30. As a result, as indicated by the curved line 403, the drive power of the backlight 30 at the operating time t1 increases from p1 to p2 by the operation of the drive unit 20. Accordingly, the display device 1 maintains the display brightness c3 as indicated by the curved line 404.

At the operating time t2 at which degradation of the backlight 30 has proceeded, the value of k decreases from 1 to a value close to 0. Consequently, as indicated by the curved line 401, the video gain increases from vg2 to vg3 by the operation of the white balance correcting unit 70. The video gain vg3 is a value close to 1, and is for example, 0.9. Accordingly, as indicated by the curved line 402, the brightness of the backlight 30 decreases to c3. Because the detection brightness output by the light detecting unit 40 has decreased to c3, the drive unit 20 increases the drive value to be output to the backlight 30. As a result, as indicated by the curved line 403, the drive power of the backlight 30 at the operating time t2 increases to p3 by the operation of the drive unit 20. The drive power p3 is rated power of circuit components constituting the drive unit 20. Consequently, the drive power is saturated at the operating time t2 as indicated by the curved line 403. If the video gain is 1, the white balance correcting unit 70 does not perform correction of the video signal. As a result, the display device 1 maintains the display brightness c3 as indicated by the curved line 404.

After the operating time t2, as indicated by the curved line 401, the video gain increases from vg3 toward a value close to 1 by the operation of the white balance correcting unit 70. As indicated by the curved line 402, even if the brightness of the backlight 30 decreases, because the drive power is saturated as indicated by the curved line 403, the drive power cannot be increased. As a result, as indicated by the curved line 404, the display brightness of the display device 1 starts to decrease from the designated brightness c3.

Figure 10:
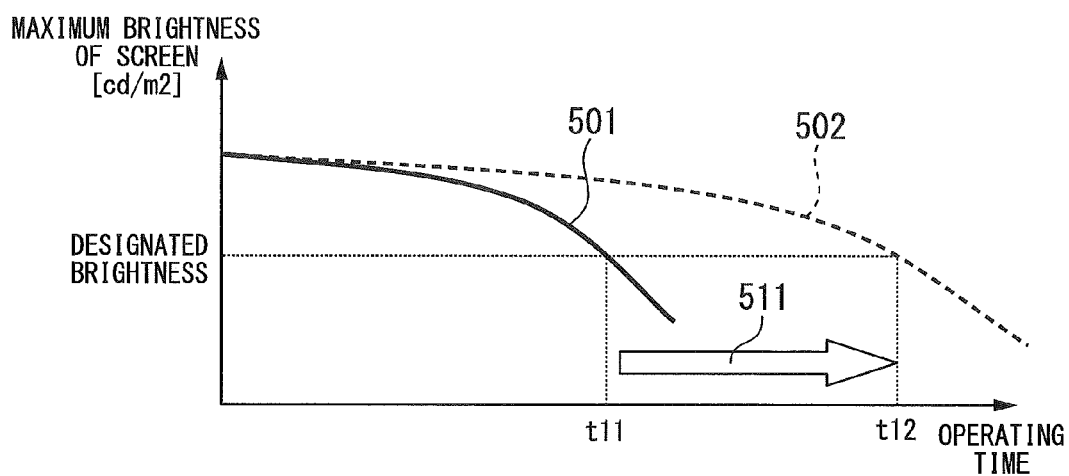
FIG. 10 is a diagram for explaining an example of the brightness life in a conventional display device, and in the display device according to the present exemplary embodiment.

In the conventional display device that does not perform the above described correction of chromaticity as in the present exemplary embodiment, as shown in FIG. 10, the initial brightness of the backlight 30 is controlled to the maximum brightness, and the size of the video signal is controlled so as to be a predetermined brightness. In the conventional display device, according to the way of use, as described above, heat generated by the drive unit is large, and the drive power is saturated at an operating time t11.

FIG. 10 is a diagram for explaining an example of the brightness life in the conventional display device and the display device 1 according to the present exemplary embodiment. In FIG. 10, the operating time is plotted on the horizontal axis, and the brightness life is plotted on the vertical axis. Moreover, the curved line 501 represents the display brightness with respect to the operating time in the conventional display device. The curved line 502 is the display brightness with respect to the operating time in the display device 1 according to the present exemplary embodiment. As indicated by the curved line 501, the brightness life of the conventional display device is the operating time t11, and is for example, about 8000 hours. Moreover, as indicated by the curved line 502, the brightness life of the display device 1 according to the present exemplary embodiment is the operating time t12, and is for example, about 30000 hours.

On the other hand, in the present exemplary embodiment, as described above, as the brightness of the backlight 30 starts to decrease, the drive power is increased and the video gain also starts to increase. Consequently, the initial video gain is suppressed to a gain smaller than 1. Then when the brightness of the backlight 30 starts to decrease, in the present exemplary embodiment, the white balance correcting unit 70 relaxes the video gain that has been suppressed, based on the display chromaticity generated by the chromaticity control unit 60, to thereby increase the video gain. As a result, the display device 1 according to the present exemplary embodiment can significantly extend the operating time t2 at which the brightness can be maintained at the designated brightness, being the predetermined brightness, as shown by the arrow 511 in FIG. 10.

As described above, the display device according to the present exemplary embodiment includes: the generating unit that generates the display chromaticity, being chromaticity of a white point to be displayed on the own display device, based on the degradation value indicating the degree of degradation of the backlight, the set chromaticity, being chromaticity of the white point based on the user setting, and the device chromaticity, being chromaticity of the white point at which the brightness becomes highest in the own display device. The display chromaticity approaches the device chromaticity from the set chromaticity, as the degree of degradation indicated by the degradation value increases.

Moreover, in the display device according to the present exemplary embodiment, the generating unit generates the display chromaticity so as to increase the color difference between the set chromaticity and the display chromaticity, and decrease the color difference between the device chromaticity and the display chromaticity, as the degree of degradation indicated by the degradation value increases.

Furthermore, the display device according to the present exemplary embodiment includes the video signal adjusting unit that adjusts the gain of the video signal or the drive value for driving the backlight, based on the display chromaticity generated by the generating unit.

According to the configuration, in the present exemplary embodiment, according to the degree of degradation when the brightness of the backlight 30 starts to decrease, the chromaticity control unit 60 calculates the display chromaticity so that the set chromaticity in the display is approximated to the device chromaticity, as the degree of degradation indicated by the degradation estimation value increases. Then the white balance correcting unit 70 increases the video gain according to degradation, based on the display chromaticity output by the chromaticity control unit 60, thereby performing correction of the chromaticity. As a result, according to the display device 1 of the present exemplary embodiment, the set chromaticity is approximated to the device chromaticity according to the degradation degree of the light source of the backlight 30, thereby enabling to suppress the correction amount. Consequently, as compared with the conventional art, because the power for driving the backlight 30 can be suppressed, heat generated by the drive unit 20 can be reduced. As a result, according to the display device 1 of the present exemplary embodiment, the operating time during which the brightness can be maintained at the designated brightness being the predetermined brightness, can be prolonged.

Moreover, as described above, the display device 1 according to the present exemplary embodiment shifts and corrects the set chromaticity with the passage of time, according to degradation of the backlight 30.

In the present exemplary embodiment, an example in which the device chromaticity estimating unit 601 estimates the device chromaticity, based on the detection chromaticity output by the light detecting unit 40 has been described. However, it is not limited thereto. The device chromaticity estimating unit 601 may use the drive value output by the drive unit 20, the operating time since the initial state in which the backlight 30 is caused to emit light, or a predetermined fixed value to estimate the device chromaticity.

For example, the device chromaticity estimating unit 601 may read the fixed value stored in the own unit beforehand and use the read fixed value for the device chromaticity.

Moreover, the device chromaticity estimating unit 601 may obtain from the drive unit 20 the initial drive value at the time of emitting light by the LED 31 of the backlight 30 with predetermined brightness, and store the obtained initial drive value in the own unit. The device chromaticity estimating unit 601 may obtain from the drive unit 20, the current drive value for when the LED 31 of the backlight 30 emits light with the predetermined brightness, and estimate the device chromaticity based on the obtained current drive value and the stored initial drive value. Furthermore, the value stored beforehand corresponding to the BL drive value may be used for the device chromaticity.

Alternatively, the device chromaticity estimating unit 601 may measure the operating time from the initial state in which the backlight 30 is caused to emit light. Then the BL degradation presuming unit 602 may estimate the device chromaticity based on the measured operating time. Moreover, the value stored beforehand corresponding to the operating time may be used for the device chromaticity.

In the present exemplary embodiment, an example in which the BL degradation presuming unit 602 presumes the BL degradation value by using the drive value output by the drive unit 20 has been described. However, it is not limited thereto. The BL degradation presuming unit 602 may presume the BL degradation value based on the detection brightness and the detection chromaticity output by the light detecting unit 40, the device chromaticity estimated by the device chromaticity estimating unit 601, the operating time from the initial state in which the backlight 30 is caused to emit light, or the like.

For example, the BL degradation presuming unit 602 may store the detection brightness output by the light detecting unit 40 and initial value of the detection chromaticity, respectively, in the storage unit 603. Then the BL degradation presuming unit 602 may use the current detection brightness output by the light detecting unit 40 and the initial value of the detection brightness stored in the storage unit 603 to estimate the BL degradation value, based on the difference or the ratio between the initial value of detection brightness and current detection brightness. Similarly, the BL degradation presuming unit 602 may use the current detection chromaticity output by the light detecting unit 40 and the initial value of detection chromaticity stored in the storage unit 603 to estimate the BL degradation value, based on the difference or the ratio between the initial value of the detection brightness and the current detection brightness.

Moreover, the BL degradation presuming unit 602 may measure the operating time from the initial state in which the backlight 30 is caused to emit light. Then the BL degradation value corresponding to the operating time may be stored beforehand in the storage unit 603 in association therewith. The BL degradation presuming unit 602 may read the BL degradation value stored in the storage unit 603 corresponding to the measured operating time to estimate the BL degradation value.

Alternatively, the BL degradation presuming unit 602 may obtain the device chromaticity estimated by the device chromaticity estimating unit 601 to estimate the BL degradation value, based on the difference or the ratio between the obtained device chromaticity and the current detection chromaticity output by the light detecting unit 40. Moreover, the BL degradation value stored beforehand corresponding to the device chromaticity and the operating time may be used.

In the present exemplary embodiment, an example in which the BL degradation presuming unit 602 calculates k, being the BL degradation value, by linear interpolation using the equation (1) has been explained. However, it is not limited thereto.

Figure 11:
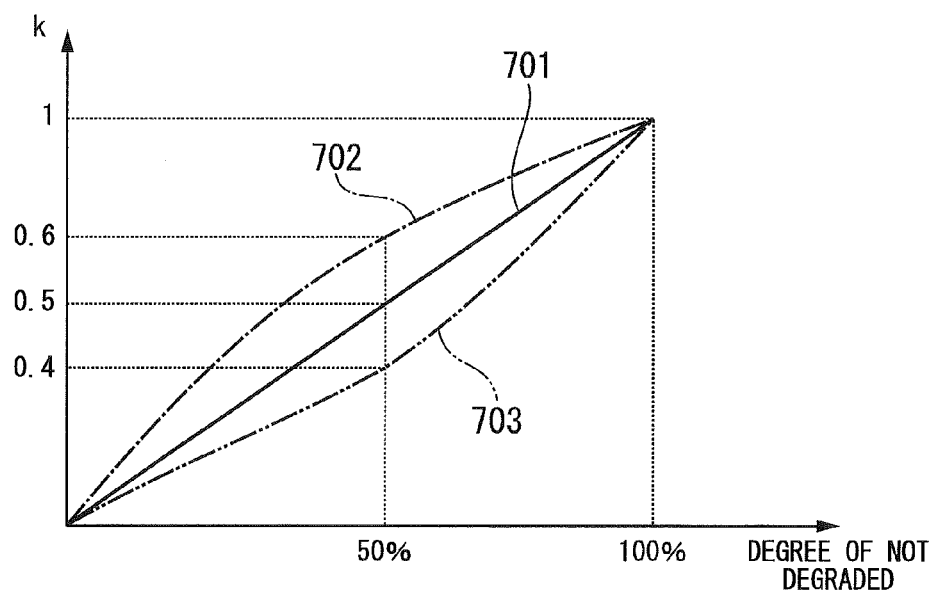
FIG. 11 is a diagram for explaining a BL degradation value according to the first exemplary embodiment.

FIG. 11 is a diagram explaining the BL degradation value according to the present exemplary embodiment. In FIG. 11, the degree in which the LED 31 of the backlight 30 is not degraded is plotted on the horizontal axis, and k being the BL degradation value is plotted on the vertical axis. Regarding the degree in which the LED 31 is not degraded, 0% is the degree of not degraded, and the percentage is approximated to 100% with degradation proceeding.

The straight line 701 is k described in the equation (1), and the value increases from 0 to 1 proportionally depending on the degree of degradation. The way of change of k with respect to the degree of degradation in the curved lines 702 and 703 is different from the degree of degradation indicated by the straight line 701, in a range including the vicinity of 50%. For example, when the degree of degradation is 50%, k is 0.5 in the straight line 701, k is 0.6 in the curved line 702, and k is 0.4 in the curved line 703.

The BL degradation presuming unit 602 may store a LUT (lookup table), in which the value of k being the BL degradation value is associated with the degree of degradation shown in FIG. 11, beforehand in the storage unit 603. Then the BL degradation presuming unit 602 may estimate the BL degradation value by using the LUT stored in the storage unit 603, based on the drive value output by the drive unit 20.

Moreover, in the present exemplary embodiment, an example in which the white balance correcting unit 70 corrects the video gain according to the display chromaticity output by the chromaticity control unit 60 has been described. However, it is not limited thereto. For example, the chromaticity control unit 60 may generate a correction value for changing the drive value for driving the backlight 30, based on the calculated display chromaticity, and output the generated drive value to the drive unit 20. Furthermore, the chromaticity control unit 60 may distribute the set chromaticity to the white balance correcting unit 70 and the drive unit 20 so as to correct both the video gain and the drive value. In this case, the white balance correcting unit 70 is the video signal adjusting unit that adjusts the drive value for driving the light source of the backlight 30, based on the display chromaticity, being the correction value generated by the chromaticity control unit 60 serving as the generating unit.

Second Exemplary Embodiment

In the first exemplary embodiment, an example in which the display device 1 performs adjustment of the video gain according to the display chromaticity has been described. However, it is not limited thereto. In the present exemplary embodiment, an example in which generation of the display chromaticity is performed by a device that outputs, for example, a video signal is described.

Figure 12:
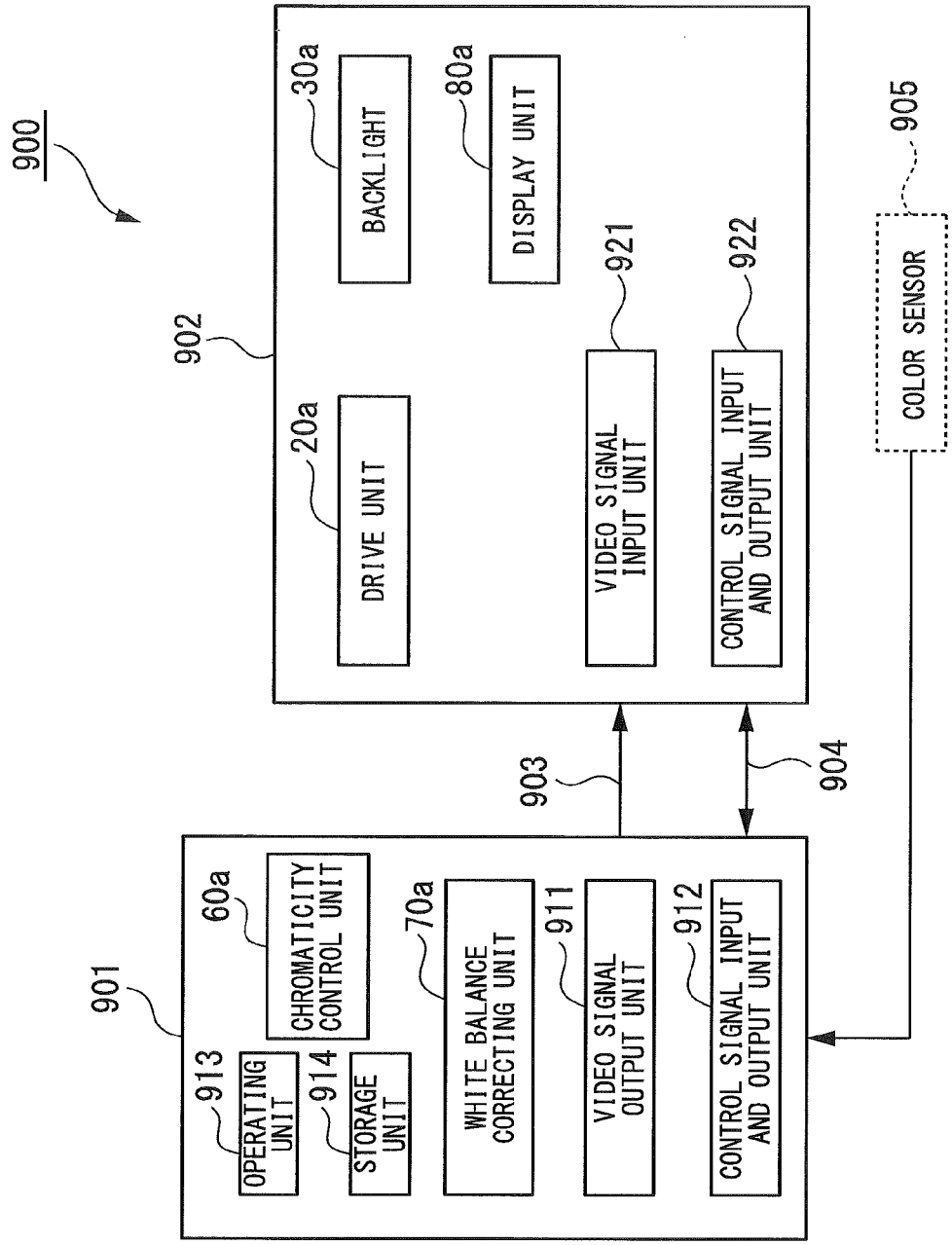
FIG. 12 is a diagram for explaining a configuration example of a display system according to a second exemplary embodiment.

FIG. 12 is a diagram for explaining a configuration example of a display system 900 according to the present exemplary embodiment. As shown in FIG. 12, the display system 900 includes a video output device 901 and a display device 902. The video output device 901 and the display device 902 are connected by a video cable 903 and a control signal cable 904. The control signal cable 904 is, for example, a USB (Universal Serial Bus) cable.

A color sensor 905 is attached to the display device 902. The color sensor 905 is a functional unit corresponding to the light detecting unit 40 in FIG. 1. The color sensor 905 outputs the detected detection brightness to the video output device 901.

The video output device 901 is configured to include a video signal output unit 911, a control signal input and output unit 912, an operating unit 913, a storage unit 914, a chromaticity control unit 60*a*, and a white balance correcting unit 70a. Moreover, the video output device 901 is, for example, a PC (personal computer).

The operating unit 913 receives set brightness and set chromaticity set by an operation of a user, and stores the received set brightness and set chromaticity in the storage unit 914. The operating unit 913 includes, for example, a switch or a remote-control light receiving unit provided in a body.

The set brightness and set chromaticity are stored in the storage unit 914.

The chromaticity control unit 60a obtains detection chromaticity output by the color sensor 905.

The chromaticity control unit 60a calculates the display chromaticity based on the set chromaticity stored in the storage unit 914, a drive value received from the display device 902, and the obtained detection chromaticity, and outputs the calculated display chromaticity to the white balance correcting unit 70a. The configuration of the chromaticity control unit 60a is the same as that of the chromaticity control unit 60 described in the first exemplary embodiment. Consequently, the chromaticity control unit 60a calculates the display chromaticity by using the equation (2) as in the first exemplary embodiment. Moreover, as in the first exemplary embodiment, a BL degradation value to be used for calculation is not limited to the equation (1) by the linear interpolation, and may be calculated by using a LUT in which the value of k is associated with the degree of degradation shown in FIG. 11, which has been stored in the own unit.

The white balance correcting unit 70a controls the gain of a video signal (hereinafter, referred to as "video gain") input from outside or generated by the own device according to the display chromaticity output by the chromaticity control unit 60a, and outputs the controlled video signal to the video signal output unit 911.

The video signal output unit 911 outputs the video signal output from the white balance correcting unit 70a, to the display device 902 via the video cable 903.

The control signal input and output unit 912 transmits the set brightness stored in the storage unit 914 and the detection value output by the color sensor 905, to the display device 902 via the control signal cable 904. The control signal input and output unit 912 receives information indicating the drive value for driving a backlight 30a provided in the display device 902, from the display device 902 via the control signal cable 904.

The display device 902 includes a video signal input unit 921, a control signal input and output unit 922, a drive unit 20a, a backlight 30a, and a display unit 80a.

The drive unit 20a, the backlight 30a, and the display unit 80a are functional units corresponding to the drive unit 20, the backlight 30, and the display unit 80 of the functional units respectively shown in FIG. 1.

The drive unit 20a generates a drive value of the backlight 30a, based on the set brightness and a detection value output by the control signal input and output unit 922, and outputs the generated drive value to the backlight 30a and the control signal input and output unit 922. The drive unit 20a may directly receive the detection value output by the light detecting unit 40.

The backlight 30a emits light according to the drive value output by the drive unit 20a.

The video signal input unit 921 outputs the video signal received from the video output device 901, to the display unit 80a.

The control signal input and output unit 922 generates information indicating a drive value based on the drive value output by the drive unit 20a, and transmits the generated information indicating the drive value, to the video output device 901 via the control signal cable 904. Moreover, the control signal input and output unit 922 receives the set brightness and the detection value from the video output device 901 via the control signal cable 904.

The display unit 80a displays the video signal received by the video signal input unit 921 from the video output device 901.

As described above, the display system according to the present invention is a display system including the display device and the video output device. The display device includes the backlight having a light source, and the drive unit that drives the backlight. The video output device includes: the generating unit that generates the display chromaticity, being chromaticity of a white point to be displayed on the display device, based on the degradation value indicating the degree of degradation of the backlight, the set chromaticity, being chromaticity of the white point based on the user setting, and the device chromaticity, being chromaticity of the white point at which the brightness becomes highest in the display device; and the video signal adjusting unit that adjusts the gain of the video signal or the drive value for driving the backlight, based on the display chromaticity generated by the generating unit. The display chromaticity approaches the device chromaticity from the set chromaticity, as the degree of degradation indicated by the degradation value increases.

Moreover, the video output device according to the present exemplary embodiment includes: the generating unit that generates the display chromaticity, being chromaticity of a white point to be displayed on the display device, based on the degradation value indicating the degree of degradation of the backlight, the set chromaticity, being chromaticity of the white point based on the user setting, and the device chromaticity, being chromaticity of the white point at which the brightness becomes highest in the display device; the video signal adjusting unit that adjusts the gain of the video signal or the drive value for driving the backlight, based on the display chromaticity generated by the generating unit; and the output unit that outputs the video signal or the drive value that has been adjusted by the video signal adjusting unit, to the display device having the backlight. The display chromaticity approaches the device chromaticity from the set chromaticity, as the degree of degradation indicated by the degradation value increases.

Consequently, the video output device 901 outputs the corrected video signal to the display device 902 depending on the display chromaticity. Then the display device 902 transmits the information indicating the drive value required for calculating the display chromaticity, to the video output device 901. According to such a configuration, even in the display system 900 according to the present exemplary embodiment, the time for maintaining the brightness selected by the user can be improved as in the first exemplary embodiment.

In the first and second exemplary embodiments, an example has been described in which a white LED is used for the backlight 30 as the light source, but the light source is not limited thereto. In the backlight 30, white light may be generated by mixing LED lights of three light sources such as red LED, green LED, and blue LED. In this case, the drive unit 20 may have a drive unit for each red LED, green LED, and blue LED. Alternatively, the white light may be generated by the green LED and the blue LED, and a fluorescent substance that emits light by being excited by these two LEDs. In this case, the drive unit 20 may have a drive unit for each of the green LED and the blue LED.

As described above, in the present invention, an example has been described in which the backlight 30 (including 30a) is used for the backlight of the display device 1 (including the display device 902). However, the present invention is not limited thereto. The backlight 30 (including 30a) may be used for a projector light source, or a light source for a laser TV and the like. Moreover, the display device 1 (including the 902) in the present exemplary embodiment may be applied to a personal digital assistance, a navigation system, an advertisement indicator lamp, a digital signage, and the like.

A program for realizing the function of the chromaticity control unit 60 in FIG. 1, or the chromaticity control unit 60a in FIG. 12, of the present exemplary embodiment may be recorded in a computer readable recording medium, and the program recorded in the recording medium may be read and executed by a computer system, thereby performing the respective processes of the respective units. The "computer system" referred to herein includes hardware such as an OS and a peripheral device.

Moreover, if a WWW system is used, the "computer system" includes a website providing environment (or a display environment).

Furthermore, "computer readable recording medium" stands for portable media such as a flexible disk, a magnetooptic disk, a ROM (Read Only Memory), and a CD-ROM, or a storage device such as a USB (Universal Serial Bus) memory connected via a USB I/F (interface), a hard disk or the like incorporated in the computer system. Furthermore, the "computer readable recording medium" includes a medium that holds a program for a certain period of time such as a volatile memory in the computer system, which becomes a server or a client. Moreover, the above program may realize a part of the functions described above, and may realize the functions described above in combination with a program recorded beforehand in the computer system.

REFERENCE SYMBOLS

1 Display device
10 Set brightness designating unit
20, 20a Drive unit
30, 30a Backlight
40 Light detecting unit
50 Set chromaticity designating unit
60, 60a Chromaticity control unit
70, 70a White balance correcting unit
80, 80a Display unit
601 Device estimating unit
602 BL degradation presuming unit
603 Storage unit
604 Display chromaticity correcting unit
900 Display system
901 Video output device
902 Display device
903 Video cable
904 Control signal cable
911 Video signal output unit
912, 922 Control signal input and output unit
921 Video signal input unit

The invention claimed is:

1. A display device comprising:
a generator configured to generate display chromaticity based on a degradation value, a set chromaticity and device chromaticity, the display chromaticity being chromaticity of a white point to be displayed on the display device, the degradation value indicating a degree of degradation of a backlight, the set chromaticity being chromaticity of a white point based on user setting, the device chromaticity being chromaticity of a white point at which brightness becomes highest in the display device,
wherein the generator is configured to make the display chromaticity approach the device chromaticity from the set chromaticity, as the degree of degradation indicated by the degradation value increases.

2. The display device according to claim 1, wherein the generator is configured to increase a color difference between the set chromaticity and the display chromaticity and is configured to decrease a color difference between the device chromaticity and the display chromaticity, as the degree of degradation increases, to generate the display chromaticity.

3. The display device according to claim 1, further comprising:
a video signal adjuster configured to adjust a gain of a video signal or a drive value for driving the backlight, based on the display chromaticity generated by the generator.

4. The display device according to claim 1, wherein the generator is configured to use, as the device chromaticity, a value calculated based on at least one of:
a predetermined fixed value;
an operating time of the backlight;
chromaticity of the backlight for when the backlight emits light with a predetermined drive value; and
a drive value for when the backlight is driven so as to have predetermined brightness.

5. The display device according to claim 1, wherein the generator is configured to use, as the degradation value, a value is calculated based on at least one of:
a difference or ratio between an initial value and a current value of a drive value for driving the backlight;
a difference or ratio between an initial value and a current value of chromaticity of the backlight;
a difference or ratio between an initial value and a current value of brightness of the backlight; and
an operating time of the backlight from an initial state until present.

6. The display device according to claim 1, wherein the generator is configured to use, as the degradation value, a value approaching 0 from 1 with an increase of the degree of degradation, and generates the display chromaticity by using a following expression:

$$\text{the degradation value} \times \text{the set chromaticity} + (1 - \text{the degradation value}) \times \text{the device chromaticity}.$$

7. A display system comprising a display device and a video output device, wherein
the display device includes:
a backlight that includes a light source; and
a unit driver configured to drive the backlight,
the video output device includes:
a generator configured to generate display chromaticity based on a degradation value, a set chromaticity and device chromaticity, the display chromaticity being chromaticity of a white point to be displayed on the display device, the degradation value indicating a degree of degradation of the backlight, the set chromaticity being chromaticity of a white point based on user setting, the device chromaticity being chromaticity of a white point at which brightness becomes highest in the display device; and a video signal adjuster configured to adjust a gain of a video signal or a drive value for driving the backlight, based on the display chromaticity generated by the generator, and the generator is configured to make the display chromaticity approach the device chromaticity from the set chromaticity, as the degree of degradation indicated by the degradation value increases.

8. A video output device comprising:

a generator configured to generate display chromaticity based on a degradation value, a set chromaticity and device chromaticity, the display chromaticity being chromaticity of a white point to be displayed on a display device, the degradation value indicating a degree of degradation of a backlight of the display device, the set chromaticity being chromaticity of a white point based on user setting, the device chromaticity being chromaticity of a white point at which brightness becomes highest in the display device;

a video signal adjuster configured to adjust a gain of a video signal or a drive value for driving the backlight based on the display chromaticity generated by the generator; and an output driver configured to output the video signal or the drive value that has been adjusted by the video signal adjuster, to the display device, wherein the generator is configured to make the display chromaticity approach the device chromaticity from the set chromaticity, as the degree of degradation indicated by the degradation value increases.

9. A method for controlling a display device, the method comprising:

generating display chromaticity based on a degradation value, a set chromaticity and device chromaticity, the display chromaticity being chromaticity of a white point to be displayed on the display device, the degradation value indicating a degree of degradation of a backlight of the display device, the set chromaticity being chromaticity of a white point based on user setting, the device chromaticity being chromaticity of a white point at which brightness becomes highest in the display device; and adjusting a gain of a video signal or a drive value for driving the backlight based on the display chromaticity generated by the generating, wherein the display chromaticity is made to approach the device chromaticity from the set chromaticity, as the degree of degradation indicated by the degradation value increases.

* * * * *